US006796623B1

(12) United States Patent
Fontana et al.

(10) Patent No.: US 6,796,623 B1
(45) Date of Patent: Sep. 28, 2004

(54) ELEMENT FOR THE FRAME OF A CABINET

(75) Inventors: Rodolfo Fontana, Clivio (IT); Cristian Cagliani, Molteno (IT)

(73) Assignee: ABB Service S.r.l. (IT)

( * ) Notice: Subject to any disclaimer, the term of this patent is extended or adjusted under 35 U.S.C. 154(b) by 21 days.

(21) Appl. No.: 10/168,682
(22) PCT Filed: Nov. 8, 2000
(86) PCT No.: PCT/EP00/11242
  § 371 (c)(1),
  (2), (4) Date: Sep. 13, 2002
(87) PCT Pub. No.: WO01/47083
  PCT Pub. Date: Jun. 28, 2001

(30) Foreign Application Priority Data

Dec. 21, 1999 (IT) .......................................... MI99A2675

(51) Int. Cl.$^7$ .............................................. A47G 29/00
(52) U.S. Cl. ...................... 312/265.4; 211/26; 403/231
(58) Field of Search .......................... 211/26, 189, 191; 312/265.1–265.6, 223.1, 263, 257.1; 361/829; 403/230, 231, 256, 258, 326, 329, 408.1

(56) References Cited

U.S. PATENT DOCUMENTS

| 3,572,787 | A | * | 3/1971 | Timmerman et al. | ....... 403/205 |
| 3,603,628 | A |  | 9/1971 | Smith et al. | |
| 4,045,104 | A | * | 8/1977 | Peterson | ................... 312/265.4 |
| 4,391,545 | A | * | 7/1983 | Zummer | ..................... 403/189 |
| 5,944,439 | A |  | 8/1999 | Ellsworth et al. | |
| 6,379,074 | B1 | * | 4/2002 | Chin et al. | ................... 403/231 |
| 6,471,434 | B2 | * | 10/2002 | Chin et al. | ................... 403/175 |
| 6,561,603 | B2 | * | 5/2003 | Knab et al. | .............. 312/265.4 |
| 2001/0037988 | A1 | * | 11/2001 | Knab et al. | ................. 211/189 |

FOREIGN PATENT DOCUMENTS

| DE | 40 36 664 | * | 5/1992 |
| EP | 0872930 A2 | | 10/1998 |
| GB | 2253456 A | | 9/1992 |

* cited by examiner

Primary Examiner—Janet M. Wilkens
(74) Attorney, Agent, or Firm—Connolly, Bove, Lodge & Hutz LLP

(57) ABSTRACT

A frame element for the fame of a cabinet for an electrical panel is provided. The frame element includes first and second corner joints and first and second connection elements. The first and second corner joints are each formed as a monolithic body and have first and second arms protruding from a longitudinal elongated element of the monolithic body. The first and second corner joints further include third and fourth arms for connection to additional components of the frame. The third and fourth arms are arranged parallel to each other and lie substantially at right angles to the elongated clement and the first and second arms. The first connection element has an elongated body with opposite ends that are suitable for connection to first arms of the first and second corner joints. The second connection element has an elongated body with opposite ends that are suitable for connection to second arms of the first and second corner joints. Coupling means are provided on the first and second corner joints to facilitate the connection of the first and second corner joints to the first and second connection elements and to the additional components of the frame.

18 Claims, 6 Drawing Sheets

ELEMENT FOR THE FRAME OF A CABINET

FIELD OF THE INVENTION

Description

The present invention relates to an element for the frame of a cabinet for an electrical panel.

BACKGROUND OF THE INVENTION

Generally, cabinets for low-voltage electrical panels are specifically designed and built so as to meet the functional and installation requirements of the components that constitute the panel. It is in fact known that electrical panels use a system of mutually parallel metallic bars, each of which is connected to a corresponding polarity of a power supply system. Inside the cabinet, the bars are electrically connected to the devices used in the panel, for example circuit breakers, and are geometrically coupled to appropriate insulation and support devices; said insulation and support devices, in addition to mutually electrically insulating the bars, allow to connect them to the structure of the cabinet. In this manner, any electrodynamic stresses produced by the flow of current in the bars are discharged onto the structure of the cabinet, which accordingly must have adequate structural strength characteristics. Furthermore, the electrical devices are arranged on one or more fixing guides, which are connected to the frame of the cabinet either directly or by using additional connecting elements. In order to meet these requirements, cabinets are generally provided with a structure shaped like a parallelepiped, inside which there is an adequate space suitable to accommodate the components of the panel and whose frame allows the anchoring of the elements that support said components, of the cladding panels and of the door of the cabinet.

In particular, the frame comprises two subframes which respectively constitute the lower and upper bases of the parallelepipedal structure; said subframes are typically constituted by four angular elements, generally known as three-way corner joints, which are mutually connected in pairs by virtue of profiled elements arranged substantially in a horizontal position and commonly known as cross-members. In turn, the subframes are mutually connected by using vertical profiled elements, or uprights, each of which connects two corresponding joints. Holes are furthermore provided along the vertical extension of the uprights for the direct fixing of the supporting elements of the electrical devices and of the distribution bars, or for the fixing of intermediate cross-members to which said supporting elements are connected.

In the current state of the art, this solution, despite ensuring an advantageous modular construction, is not entirely satisfactory, particularly as regards the shape and large number of the components required to form the subframes. The connection between the pairs of elements, for example a corner joint and a cross-member, in fact occurs by using a plurality of fixing screws, at least two for each coupling, so as to allow adequate connection and correct mutual positioning of the two elements.

These operations, owing to the number of profiled elements used and therefore to the large number of connections to be provided, require long execution times and a large number of fixing screws; furthermore, in view of the stresses, mainly shear stresses, to which the screws are subjected, said screws may break, consequently entailing a technical drawback.

It is also noted that at least two operators are usually required in order to correctly perform the connections, so that a first operator keeps the elements to be connected in the correct position and the second one actually produces the various connections; accordingly, the assembly and installation costs of the panel increase. Otherwise, i.e., if a single operator works, operations are very time-consuming and difficult to perform.

SUMMARY OF THE INVENTION

The aim of the present invention is to provide an element for the frame of a cabinet for an electrical panel which allows to reduce the number of components of said frame, with a consequent benefit from the production standpoint. Within the scope of this aim, an object of the present invention is to provide an element for the frame of a cabinet for an electrical panel which allows to simplify the connection between the various elements of the frame, thus facilitating assembly and reducing production time.

Another object of the present invention is to provide an element for the frame of a cabinet for an electrical panel which is suitable for optimization of the use of the labor required for its production, with a consequent benefit in terms of costs. Another object of the present invention is to provide an element for the frame of a cabinet for an electrical panel which allows to reduce the additional fixing elements to be used, accordingly reducing the number of the corresponding fixing operations.

Another object of the present invention is to provide an element for the frame of a cabinet for an electrical panel in which there is an optimum distribution of the stresses to which the various connections are subjected, so as to avoid any mechanical failures while ensuring high strength of said connections. Another object of the present invention is to provide an element for the frame of a cabinet for an electrical panel which is highly reliable, relatively easy to manufacture and at competitive costs.

This aim, these objects and others which will become apparent hereinafter are achieved by an element for the frame of a cabinet for an electrical panel, characterized in that it comprises:

a first corner joint and a second corner joint which are formed as a monolithic body which has a longitudinal elongated element from the opposite ends of which there protrude a first arm and a second arm, said first and second arms being substantially parallel to each other and perpendicular to the elongated element, and a third arm and a fourth arm for connection to additional components of the frame, said third and fourth arms being arranged substantially parallel to each other and lying substantially at right angles to the elongated element and to the first and second arms;

a first connection element which has an elongated body whose opposite ends are suitable to be connected respectively to the first arm of the first corner joint and to the first arm of the second corner joint;

a second connection element which has an elongated body whose opposite ends are suitable to be connected respectively to the second arm of the first corner joint and to the second arm of the second corner joint; and in that on said first and second corner joints there are coupling means which are suitable to facilitate their connection to said first and second connection elements and to said additional components of the frame.

The element according to the invention therefore allows to reduce, with respect to the known art, the components required to produce the frame; it furthermore comprises components which are configured so as to facilitate the various connections, with significant advantages from the point of view of simplicity, speed and cost of assembly.

BRIEF DESCRIPTION OF THE DRAWINGS

Further characteristics and advantages of the invention will become apparent from the description of preferred but not exclusive embodiments of the supporting frame according to the invention, illustrated only by way of non-limitative example in the accompanying drawings, wherein.

DETAILED DESCRIPTION OF THE DRAWINGS

In the description that follows, identical reference numerals in the various figures designate identical or technically equivalent elements.

Figure 1:
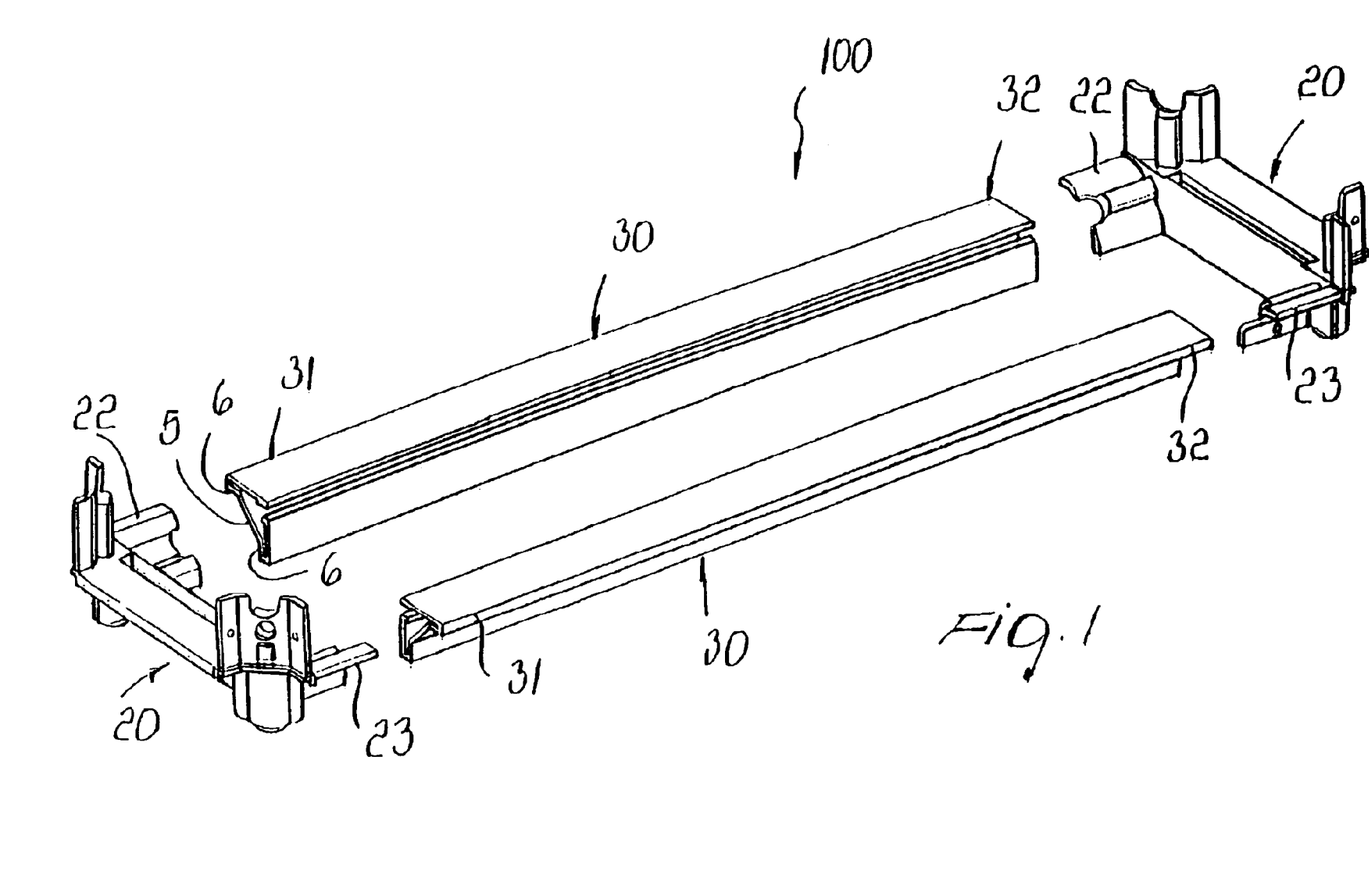
FIG. 1 is an exploded perspective view of an element for the frame of a cabinet for an electrical panel according to the invention.
Figure 2:
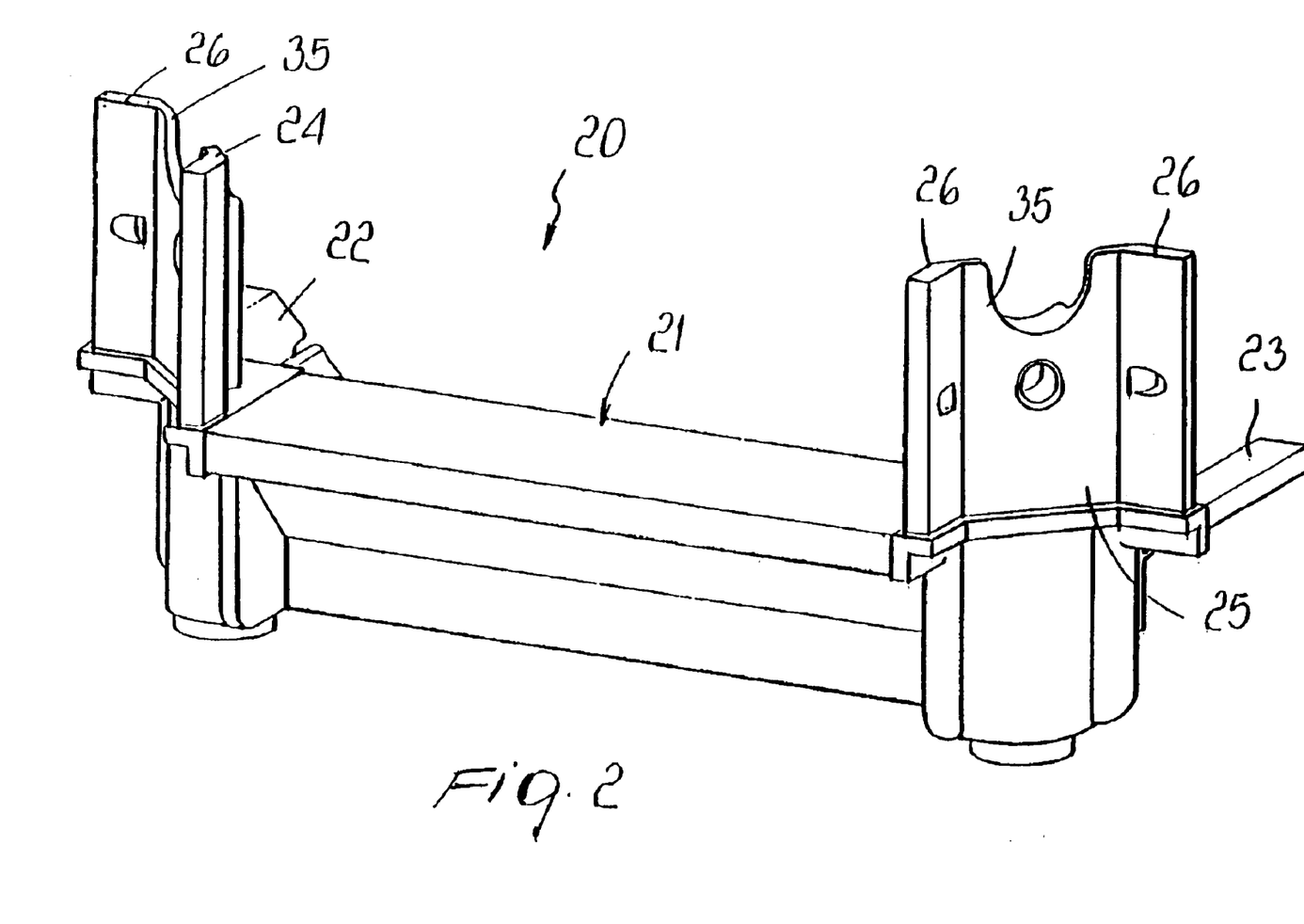
FIG. 2 is a perspective view of a corner joint used in the element according to the invention.

With reference to FIG. 1, the frame element according to the invention, generally designated by the reference numeral 100, comprises a first corner joint and a second corner joint, both designated by the reference numeral 20. Advantageously, as shown in detail in FIG. 2, both joints 20 are formed as a monolithic body which has a longitudinal elongated element 21, from the opposite ends of which there protrude a first arm 22 and a second arm 23 which are substantially parallel to each other and perpendicular to the elongated element 21; furthermore, each joint 20 has a third arm 24 and a fourth arm 25 for connection to additional components of the frame. Said components can comprise, for example, uprights or panels, and reference is made hereinafter to these specific components without thereby intending to limit in any way the scope of application of the invention. As shown in FIG. 2, the arms 24 and 25 are substantially parallel to each other and lie substantially at right angles to the elongated element 21 and to the first and second arms 22 and 23.

Coupling means are furthermore formed on the corner joints 20 and are suitable to facilitate their connection to said additional components of the frame and to first and second connection elements, both designated by the reference numeral 30 in FIG. 1, as will become apparent in detail from the description that follows.

As shown in FIG. 1, the connection elements 30, typically constituted by two cross-members, have an elongated body whose opposite ends 31 and 32 are suitable to be connected respectively to the first arm 22 of the first corner joint 20 and to the first arm 22 of the second corner joint 20, and to the second arm 23 of the first corner joint 20 and to the second arm 23 of the second corner joint 20.

With this solution, the number of constructive components of the frame is reduced with respect to the known art; furthermore, at least the corner joints 20 can be made of plastic. In this way, despite preserving the functional and structural characteristics of the joints, one has a significant saving on manufacturing costs and easier assembly by virtue of the reduced weight and improved handling of said joints.

According to a solution which is particularly advantageous from the point of view of production, particularly as regards the construction of the molds, the first arm 22, the second arm 23, the third arm 24 and the fourth arm 25 have mutually identical profiles, with a substantially flat wall 35 from which two oblique walls 26 protrude in substantially mutually opposite directions. Furthermore, the cross-members 30 also have a profile which is substantially identical to the profile of the arms 22, 23, 24 and 25, with a substantially flat wall 5 from which two oblique walls 6 protrude in substantially mutually opposite directions; in particular, the cross-members 30 have a hollow profiled body so as to form a seat which is suitable to accommodate a portion of the corresponding arm of the joint 20. Said cross-members can be made of metallic or plastic material according to the application requirements.

Figure 3:
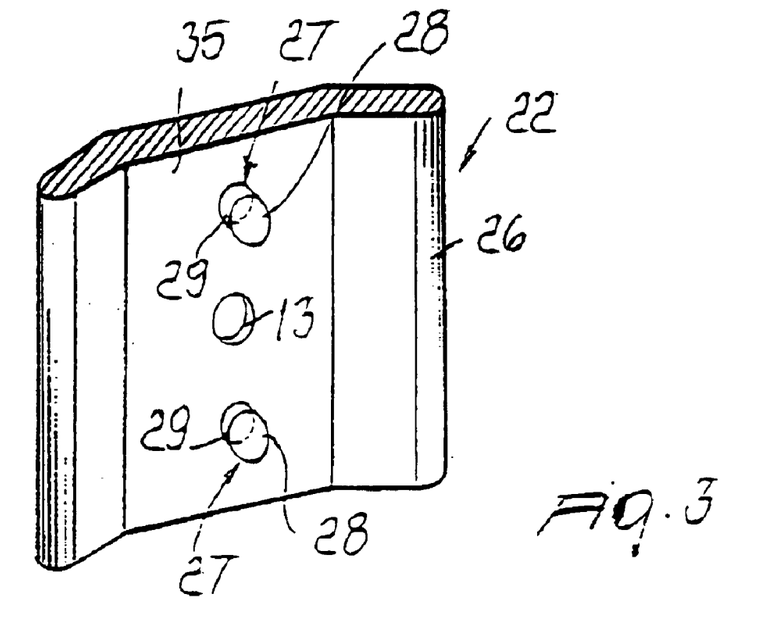
FIG. 3 is a schematic view of a portion of a corner joint with coupling means according to a first embodiment of the invention.

According to a first embodiment, the coupling means are conceived so as to facilitate direct engagement at least between the joints 20 and the connection elements 30; in particular, as shown schematically in FIG. 3, at least one protrusion 27 is formed on the wall 35 of each one of the arms 22 and 23, protrudes transversely to said wall 35, and is suitable to engage a corresponding seat 11 formed in the elements 30. In the embodiment shown in FIG. 3, two protrusions 27 are formed on the wall 35 of the arm 22, are mutually aligned along the length of the arm, and are suitable to engage in two corresponding seats formed in the corresponding end of the connection element 30. For the sake of simplicity in description, only the arm 22 is shown in FIG. 3; this solution is obviously to be understood as applying to the second arm 23 as well. Furthermore, it can be advantageously implemented on the arms 24 and 25 as well. In this manner it is possible to have a direct engagement also between the joints 20 and the corresponding components of the frame, be they panels 80, as shown in FIG. 6, or uprights 10, as shown in FIG. 7.

As shown in detail in FIG. 3, each protrusion 27 is constituted by a body which has a first base surface, which is fixed to the wall 35, and a second end surface 28, which lies opposite the base surface on an inclined plane with respect to said wall 35. In this manner, the lateral surface 29 that connects the base surface to the end surface 28 partially constitutes an abutment surface for at least one portion of the corresponding seat.

Figure 6:
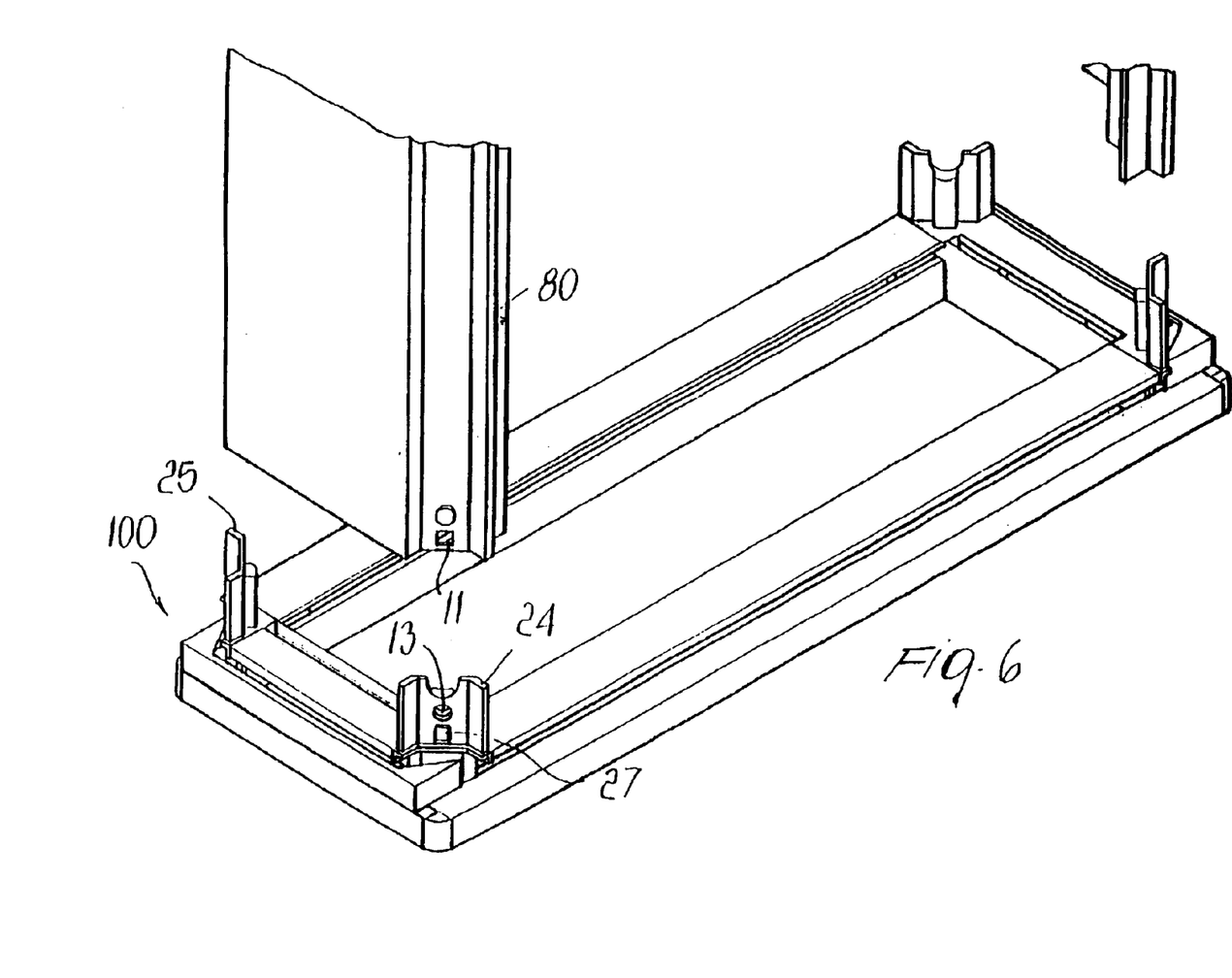
FIG. 6 is a view of the element according to the invention during connection to a panel.
Figure 7:
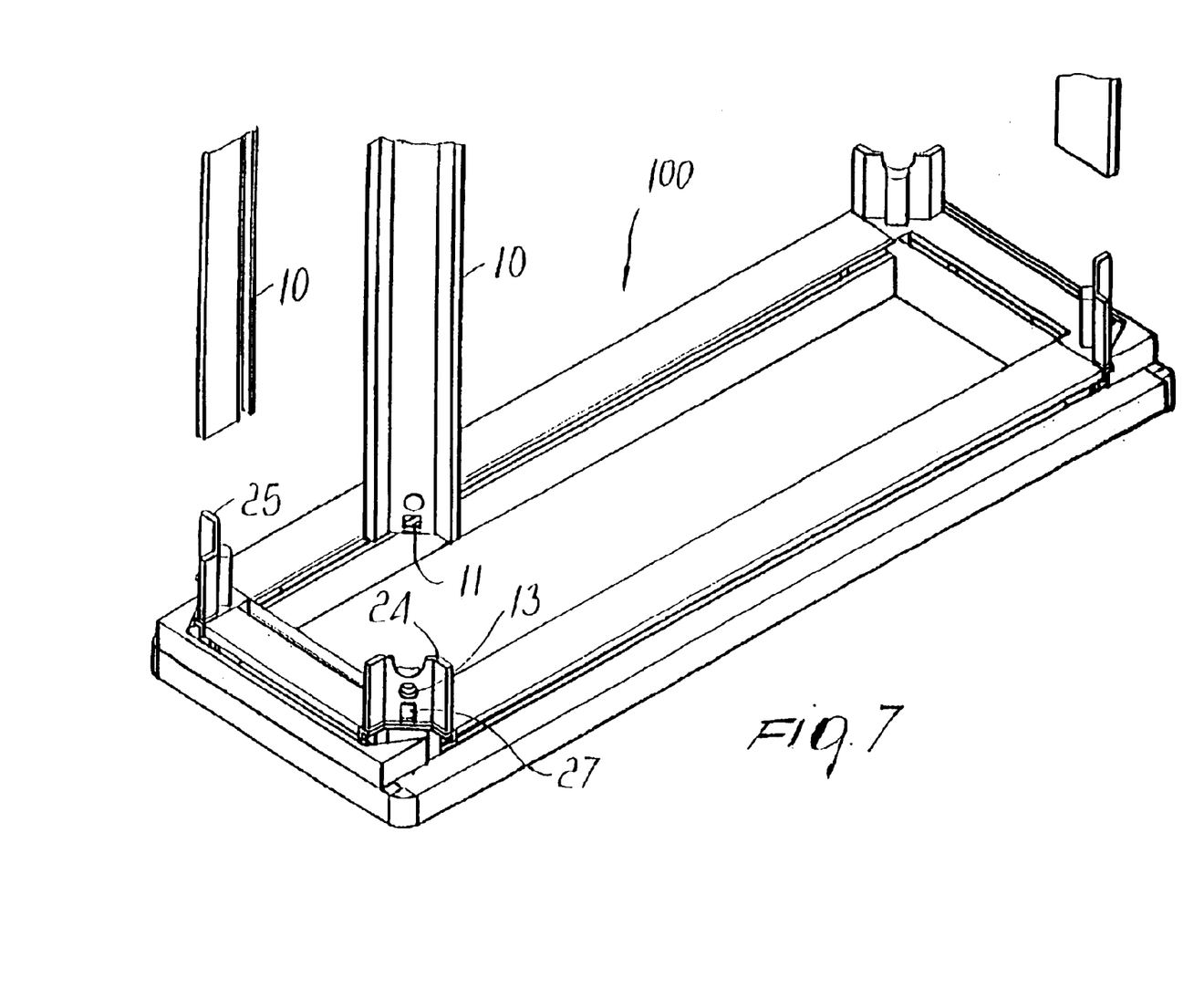
FIG. 7 is a view of the element according to the invention during connection to uprights.

Evidently, the shape and arrangement of the protrusions 27 can be varied according to the various application requirements, for example by adopting protrusions which have a substantially circular cross-section, as shown in FIG. 3, or a quadrangular cross-section, as shown in FIGS. 6 and 7, or other shapes, so long as they are compatible with the application.

In practice, during assembly, the joints 20 are arranged so as to insert each arm, for example the arm 22, in the corresponding seat of the cross-members 30; when each upright 30 is fitted over the corresponding arm, the inclined surfaces 28 of the protrusions 27 act as guides for the sliding of the cross-member and of the corresponding seats 11 until they enter said seats 11. In this situation, the lateral surface 29 of the protrusion, which connects the two end surfaces, acts as abutment element against which at least one portion of the rim of the corresponding seat 11 abuts. Accordingly, each seat 11 is practically engaged with the corresponding protrusion 27 with a solution which prevents the mutual disengagement of the two elements. Likewise, and as shown in FIGS. 6 and 7, the uprights 10 or the panel 80 are fitted directly onto the arms 24 and 25 so that the seats 11 engage the corresponding protrusions 27.

In this manner, one has a direct coupling between the structural elements which can be performed by a single operator in a very short time and without using additional fixing elements, such as for example screws, according to a solution which ensures optimum strength of the connection. Furthermore, the stresses that each connection must withstand, mainly shear stresses, are distributed along the contact surfaces established between the walls of the protrusions 27 and the walls of the seats 11.

As shown schematically in the figures, one might still provide for the use of a seat 13 in the arms of the joints in order to use an additional fixing screw, e.g. for security reasons.

Figure 4:
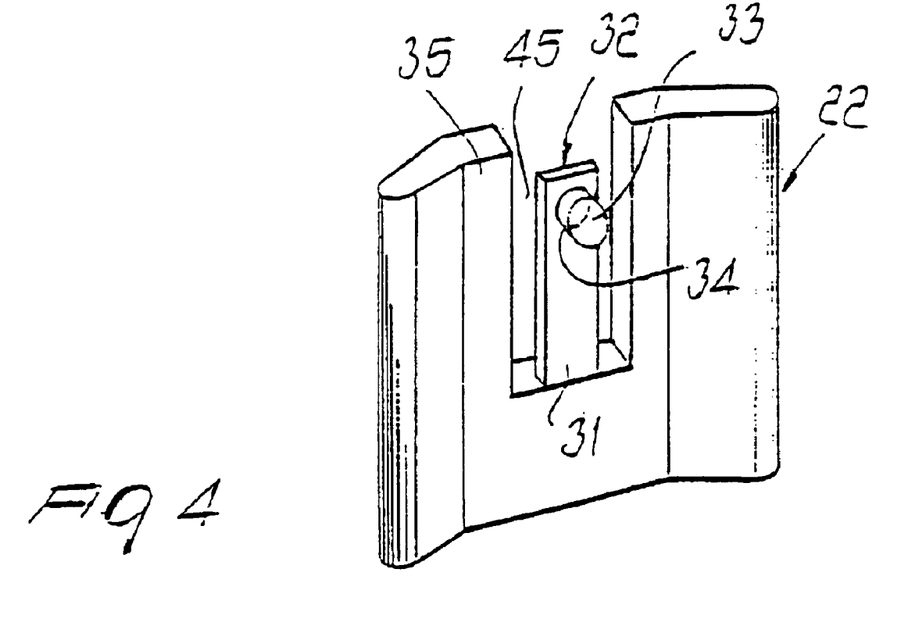
FIG. 4 is a schematic view of a portion of a joint with coupling means according to a second embodiment of the invention.

In a second embodiment, shown in FIG. 4, the joints 20 are configured so that at least on the wall 35 of the arms 22 and 23 there is a cutout central portion 45 which is substantially U-shaped; in this case, the coupling means comprise at least one flexible tab 31 which protrudes from the base of the cutout portion 45 in a direction which is substantially parallel to the wall 35. Said flexible tab 31 has an end portion 32 which is shaped so as to facilitate engagement with a corresponding seat 11 formed in the corresponding end of the connection element 30. In particular, the shaped end 32 comprises a raised portion which has a circular cross-section and has a first base surface which is fixed to the tab 31 and an end surface 33 which lies opposite the base surface substantially on a plane which is inclined with respect to the wall 35, with a shape which is similar to that of the previously described protrusion 27. As an alternative, the tab 31 might be shaped differently, for example U-shaped.

In this case also, the same solution can be advantageously implemented on the arms 24 and 25 so as to facilitate direct connection to the panels 80 or the uprights 10.

The various components are mutually assembled in a manner similar to the one described above, for example by fitting the cross-member 30 over the corresponding arms of the joint 20, so that the tab 31 flexes toward the wall 35 and facilitates, in cooperation with the inclined surface 33, the sliding of said cross-member; the shaped end 32 then enters the corresponding seat 11, and the lateral surface 34 that connects the inclined surface 33 and the base surface which is fixed to the tab 31 acts as abutment for the rim of said seat. The flexibility of the tab 31 furthermore facilitates any uncoupling of the two components. The assembly of the joints 20 and the panels 80, or of the joints 20 and the uprights 10, occurs in a manner which is fully similar to the one described earlier.

Figure 5:
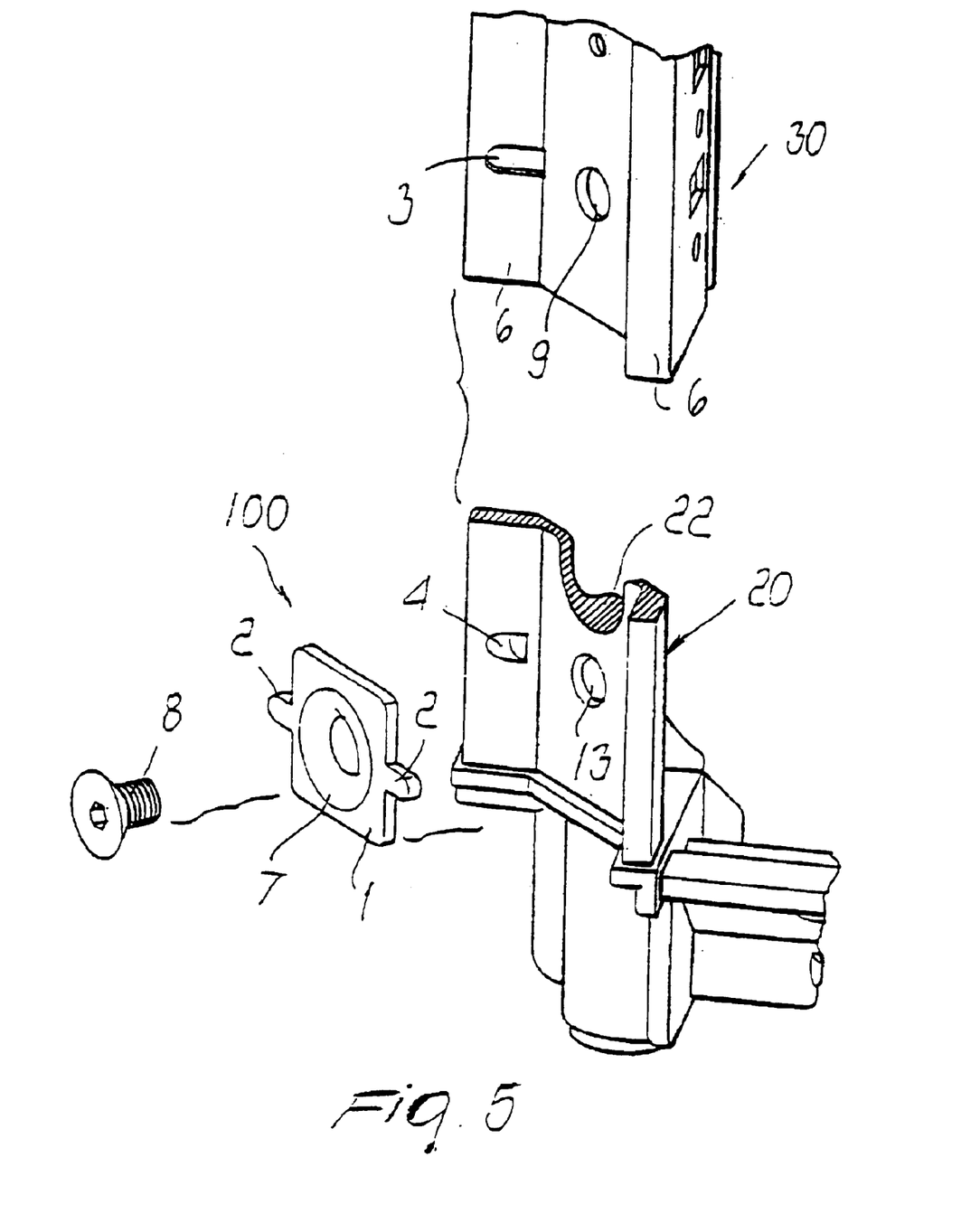
FIG. 5 is a schematic exploded view of a portion of a joint and of an upright during mutual connection by using coupling means according to another embodiment of the present invention.

In a third embodiment, the coupling means comprise two cavities 4 formed at least in the arms 22 and 23 of the joints 20 and suitable to accommodate means for engagement with the connection elements 30. In particular, as shown in FIG. 5, said engagement means comprise a substantially flat body 1, typically a plate, which has a substantially quadrilateral profile and from two sides of which two protruding wings 2 extend in mutually opposite directions. The wings 2 are each suitable to enter a corresponding slot 3 formed in the walls 6 of the connection elements 30 and to geometrically couple in said cavities 4. In this manner, the connection between the joints and the cross-members 30 occurs very rapidly and simply, by using a component which is easy to manufacture and even easier to install; in this case it is in fact sufficient to insert the arm 22 of the joint 20 in the corresponding seat of the cross-member 30, moving the slots 3 so that they overlap the seats 4, and to apply the plate 1 so that the wings 2 cross said slots 3 and enter the seats 4. In this case also, the stresses that the connection has to withstand, mainly shear stresses, are distributed along the contact surfaces established between the wings 2 and the walls of the seats 4, avoiding dangerous stress concentrations.

As an alternative, the shape of the body 1 and the number, shape and arrangement of the wings 2 may be changed appropriately according to particular requirements and/or specific applications.

As shown in FIG. 5, the body 1 can have a hole with a rounded flared rim 7 which is suitable to accommodate additional means for mutually fixing the cross-member 30 and the corner joint 20; in particular, in the illustrated embodiment, the fixing means comprise a threaded screw with a countersunk head 8 which is suitable to be inserted in a through hole 9 formed in the wall 5 and to be screwed into a threaded hole 13 formed in the arm 22. This provides a further improvement in the mutual connection of the components, with an additional surface for distributing the stresses involved, and increases the reliability of said connection. Furthermore, once connection has occurred, the countersunk head of the screw 8 is practically recessed in the space formed by the rounded rim 7, avoiding the presence of any protruding sharp elements. Clearly, this solution can also be applied as regards the connections between the arms 24 and 25 and the corresponding uprights 10 or panels 80.

In practice it has been found that the frame element according to the invention fully achieves the intended aim and objects, since it allows to reduce the components that constitute the frame and to simplify the mutual connection of the various components, with an optimized use of labor and a consequent benefit in financial terms; furthermore, the possibility to eliminate or at least drastically reduce the use of additional fixing means allows to further reduce costs and provide faster assembly operations.

The frame element thus conceived is susceptible of numerous modifications and variations, all of which are within the scope of the same inventive concept; all the details may furthermore be replaced with other technically equivalent elements. In practice, the materials and the dimensions may be any according to the requirements and the state of the art.

What is claimed is:

1. A frame element for the frame of a cabinet for an electrical panel, said frame element comprising:

a first corner joint and a second corner joint which are each formed as a monolithic body which has a longitudinal elongated element from the opposite ends of which a first arm and a second arm protrude, said first and second arms being substantially parallel to each other and perpendicular to the elongated element, and a third arm and a fourth arm for connection to additional components of the frame, said third and fourth arms being arranged substantially parallel to each other and lying substantially at right angles to the elongated element and to the first and second arms;

a first connection element which has an elongated body whose opposite ends are suitable to be connected respectively to the first arm of the first corner joint and to the first arm of the second corner joint;

a second connection element which has an elongated body whose opposite ends are suitable to be connected respectively to the second arm of the first corner joint and to the second arm of the second corner joint;

coupling means which are located on said first and second corner joints, said coupling means being suitable to facilitate connection of said first and second corner joints to said first and second connection elements and to said additional components of the frame, said first, second, third and fourth arms having mutually identical profiles with a substantially flat wall from which two oblique walls protrude in mutually opposite directions, said first and second connection elements each having a hollow profiled body with a flat wall from which two oblique walls protrude in substantially opposite directions, said hollow profiled body forming a seat which is suitable to accommodate a portion of a corresponding one of said first and second arms of said first and second corner joints.

2. The frame element according to claim 1, wherein said coupling means are formed on said first and second corner joints and are suitable to facilitate direct engagement of said first and second corner joints with said first and second connection elements.

3. The frame element according to claim 2, wherein said flat walls of said first and second arms have at least one protrusion which protrudes transversely there from, said protrusion being suitable to engage in the corresponding seat formed in the ends of said first and second connection elements.

4. The frame element according to claim 3, wherein said protrusion has a first base surface which is formed in said flat wall, a second end surface which lies opposite the base surface along a plane which is inclined with respect to said flat wall, and a third surface for connection between said first and second surfaces which forms an abutment surface for at least one portion of a rim of the corresponding seat.

5. The frame element according to claim 2, wherein said flat walls of at least said first and second arms have a U-shaped cutout central portion from a base surface of which at least one flexible tab protrudes in a direction which is substantially parallel to said wall, said tab having an end which is shaped so as to engage in the corresponding seat formed in said connection elements.

6. The frame element according to claim 5, wherein said shaped end has a raised portion which has a substantially circular cross-section and has a first base surface which is fixed to the tab, an end surface which lies opposite the base surface substantially on a plane which is inclined with respect to the flat wall, and a third surface which connects said base and end surfaces for the abutment of a portion of the edge of the corresponding seat.

7. The frame element according to claim 1, wherein said coupling means are formed on said first and second corner joints and are suitable to facilitate direct engagement of said first and second corner joints with said additional connection elements.

8. The frame element according to claim 7, wherein said flat walls of said third and fourth arms have at least one protrusion which protrudes transversely there from, said protrusion being suitable to engage in the corresponding seat formed in said additional components of the frame.

9. The frame element according to claim 8, wherein said protrusion has a first base surface which is formed in said flat wall, a second end surface which lies opposite the base surface along a plane which is inclined with respect to said flat wall, and a third surface for connection between said first and second surfaces which form an abutment surface for at least one portion of a rim of the corresponding seat.

10. The frame element according to claim 7, wherein said flat walls of said third and fourth arms have a U-shaped cutout central portion from a base surface of which at least one flexible tab protrudes in a direction which is substantially parallel to said wall, said tab having an end which is shaped so as to engage in the corresponding at formed in said additional components of the frame.

11. The frame element according to claim 1, wherein said coupling means comprise at least two cavities which are formed in said first and second arms and are suitable to accommodate means for engagement with said first and second connection elements.

12. The frame element according to claim 11, wherein said engagement means comprise a flat plate which has a substantially quadrilateral profile and from two sides of which two wings protrude in mutually opposite directions, said wings being suitable to engage in corresponding slots formed in the corresponding connection element and to geometrically couple in said cavities, a hole being formed in said plate, said hole being suitable to accommodate a threaded screw which can be inserted in a corresponding hole formed in the corresponding connection element and to be screwed into a threaded hole formed in the arm of the joint.

13. The frame element according to claim 1, wherein said coupling means comprise two cavities which are formed in said third and fourth arms and are suitable to accommodate means for engagement with said additional components of the frame.

14. The frame element according to claim 13, wherein said engagement means comprise a flat plate which has a substantially quadrilateral profile and from two sides of which two wings protrude in mutually opposite directions, said wings being suitable to engage in corresponding slots formed in said additional components of the frame and to geometrically couple in said cavities, a hole being formed in said plate, said hole being suitable to accommodate a threaded screw which can be inserted in a corresponding hole formed in the additional components of the frame and can be screwed into a threaded hole formed in the arms of the joint.

15. The frame element according to claim 1, wherein said joints are made of plastic.

16. The frame element according to claim 1, wherein said first and second connection elements are cross-members which have substantially the same profiles as the arms.

17. The frame element according to claim 1, wherein said additional structural components comprise at least one upright.

18. The frame element according to claim 1, wherein said additional structural components comprise at least one panel.

* * * * *